United States Patent [19]
Kneubuhler

[11] Patent Number: 5,853,078
[45] Date of Patent: Dec. 29, 1998

[54] VIBRATING FEEDER BOWL WITH ANNULAR ROTATING DISK FEEDER

[75] Inventor: Thomas R. Kneubuhler, Charlotte, N.C.

[73] Assignee: Menziken Automation, Inc., Charlotte, N.C.

[21] Appl. No.: 23,293

[22] Filed: Feb. 13, 1998

[51] Int. Cl.$^6$ .................................................. B65G 27/02
[52] U.S. Cl. .......................... 985/391; 198/392; 198/395
[58] Field of Search .................................. 198/391, 392, 198/395; 209/576

[56] References Cited

U.S. PATENT DOCUMENTS

| | | | |
|---|---|---|---|
| 4,007,825 | 2/1977 | Spurlin et al. | 198/770 |
| 4,453,626 | 6/1984 | Roberts et al. | 198/391 |
| 4,711,337 | 12/1987 | Bartlett | 198/391 |
| 5,042,643 | 8/1991 | Akama | 198/753 |
| 5,114,039 | 5/1992 | Walshe et al. | 221/171 |
| 5,311,977 | 5/1994 | Dean et al. | 198/395 |
| 5,314,055 | 5/1994 | Gordon | 198/395 |
| 5,314,058 | 5/1994 | Graham | 198/753 |
| 5,404,995 | 4/1995 | Graham | 198/757 |

FOREIGN PATENT DOCUMENTS 0 206 095 A2  12/1986  European Pat. Off. ........ B65G 47/24

*Primary Examiner*—Joseph E. Valenza
*Assistant Examiner*—Mark Deuble
*Attorney, Agent, or Firm*—Jenkins & Wilson, P.A.

[57] ABSTRACT

An apparatus for orienting and feeding articles or parts that is particularly adapted for use in an automated assembly system and has a feeder bowl that includes a helical internal track which terminates at the upper edge of the bowl adjacent to an annular feeder ring mounted for selective rotational movement around the feeder bowl to receive parts P therefrom. A control circuit including a stationary camera positioned above the annular feeder ring acts to control rotational movement of the annular feeder ring by an operatively connected motor in order to bring successive portions of the annular feeder ring into a predetermined vision field of the camera in order that correctly oriented parts can be differentiated by incorrectly oriented parts and a signal then provided to a pick-and-place robot to remove the correctly oriented parts. A sweeper bar is positioned at a selected location to urge incorrectly oriented parts off of the annular feeder ring and back into the feeder bowl for recycling. An alternative embodiment of the vibratory feeder bowl is also provided which utilizes a second selectively rotatable disk in concentric and spaced-apart relationship to the feeder ring to receive retrieved parts removed from the annular feeder ring in receptacles provided on the ring.

30 Claims, 9 Drawing Sheets

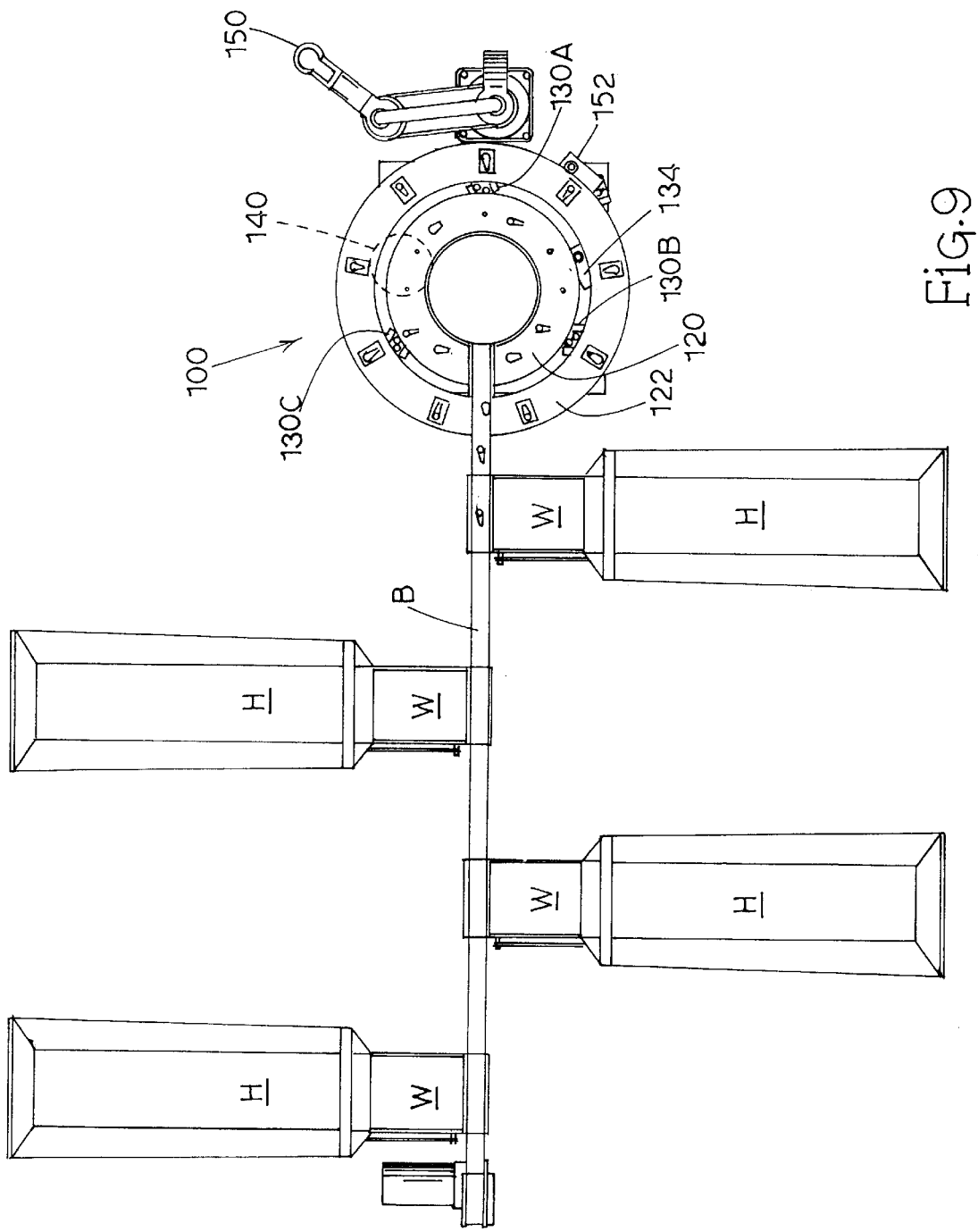

VIBRATING FEEDER BOWL WITH ANNULAR ROTATING DISK FEEDER

TECHNICAL FIELD

The present invention relates generally to vibratory feeders and more particularly to an improved vibratory article feeding device for supplying parts by a new method of feeding that is particularly well-adapted for use in an automated assembly system.

RELATED ART

Applicants have developed a novel feeder bowl incorporating a rotatably movable annular feeder ring. The novel feeder bowl provides a high throughput by utilizing both preoriented and partially oriented articles delivered to the annular feeder ring.

Of course, as is well known to those skilled in the art, vibratory feeder bowls wherein parts or workpieces are transported on an internal spiral track by vibration of the bowl is well known. Generally, feeder bowls are provided with a suitable posture-regulating means for placing the feeding parts into a predetermined posture or orientation. The parts are supplied sequentially in the predetermined posture to the next step of an assembly process by the vibratory feeder bowl. However, a well known limitation to vibratory feeder bowls is the tendency of certain types of parts or workpieces of certain shapes to jam at the posture-regulating means. When the parts become jammed, they cannot be fed to the next assembly process until the jam is detected and a jam release mechanism is actuated to forcibly eject the jammed part into the inside of the feeder bowl. A typical jam release mechanism used in the past has been an air jet.

A variant of the traditional vibratory feeder bowl is disclosed in U.S. Pat. No. 4,453,626 to Roberts et al. and utilizes a rotating annular ring. The feeder bowl contains a supply of articles or parts that are discharged upwardly by means of a peripheral ramp that leads to a gated outer rim through which the parts are discharged in a generally radial direction to a rotating annular ring that surrounds a portion of the outer periphery of the feeder bowl in order to provide an adjacent surface with the end of the internal ramp. The annular ring has a large groove therein that is adapted to receive a tangentially directed article removal conveyer for continuously removing the articles carried on the annular ring. An improved embodiment of the feeder bowl disclosed in the afore-mentioned patent is set forth in U.S. Pat. No. 4,711,337 to Bartlett, and both patents are owned by the Arthur G. Russell Company, Inc. Of Bristol, Conn. Both prior art vibratory feeder bowls having annular rotating rings are believed by applicants to be intended for use to orient and feed parts of the same type to the next processing step in an assembly procedure, and it is believed that neither feeder bowl disclosed in the two aforementioned patents lends itself to placement of a succession of same type or mixed types of properly oriented parts onto the annular ring for discharge.

By contrast, applicants' vibratory feeder bowl provides an improved feeder bowl utilizing an annular rotating ring to facilitate utilizing both correctly oriented and partially-oriented parts that are delivered by the feeder bowl to the annular ring in order to increase output of correctly oriented parts from the feeder bowl and thereby to increase total throughput of an automated assembly system in which the feeder bowl is utilized.

DISCLOSURE OF THE INVENTION

In accordance with the present invention, an improved feeder bowl utilizing a rotating annular feeder ring that provides enhanced productivity and production from the feeder bowl.

Applicants' invention is an improvement to vibratory feeder bowls of the type comprising a feeder bowl in which a generally helical track is formed that extends around the inner periphery of the bowl and which has a terminal portion at the upper edge of the bowl, and feeder bowl vibrator means for vibrating the bowl to move parts onto the track and upwardly along the track to the terminal portion of the track where at least a portion of the parts are oriented in a correct predetermined position.

The improvement comprises a rotatably movable annular feeder ring that surrounds the upper edge of the feeder bowl and has a substantially flat part-supporting surface that is generally in line with the terminal portion of the helical track. Supporting means are provided for the annular feeder ring to facilitate rotation of the feeder ring about the feeder bowl, and a feeder ring drive means is provided for intermittently rotating the ring about the feeder bowl by being selectively started and stopped. Robot means are provided for removing selected parts from the annular feeder ring and depositing the parts at a predetermined new location, and circuit means is provided including a camera positioned above a portion of the feeder ring and acting to detect parts on the ring and to signal the drive means to stop rotation of the annular ring and to then signal the robot to effect removal of correctly oriented parts from the annular feeder ring and to deposit them in a predetermined new location while the feeder ring is stationary. Then, the circuit means signals the drive means to continue rotation of the feeder ring so as to rotate a new parts-carrying portion of the annular ring into the camera's field of view. Finally, returning means are provided for returning improperly oriented parts that are rejected by the robot means and remain on the feeder ring to the feeder bowl for recycling.

An alternative embodiment of applicants' invention provides an improved vibratory feeder bowl comprising a rotatably movable annular feeder ring that surrounds the upper edge portion of the feeder bowl and has a substantially flat part-supporting surface that is generally in line with the terminal portion of the helical track. Means are provided to support the annular feeder ring for rotation about the feeder bowl, and feeder ring drive means are provided for intermittently rotating the feeder ring about the feeder bowl by being selectively started and stopped. Robot means is provided for removing selected parts from the feeder ring and depositing them at a predetermined new location, and circuit means is provided including a camera positioned above a portion of the feeder ring and acting to detect parts on the ring and to then signal the drive means to stop rotation of the ring and to then signal the robot to effect removal of correctly oriented parts from the annular feeder ring and to deposit them at a predetermined new location while the feeder ring is stationary. The circuit means then signals the drive means to continue rotation of the feeder ring so as to rotate a new parts-carrying portion of the ring into the camera's field of view.

Also, a rotatably movable annular fixture ring is provided that surrounds the annular feeder ring and is concentric therewith for being selectively rotated around the annular feeder ring by fixture ring drive means that is also in operative connection with the circuit means so that the circuit means further can act to signal the robot to deposit correctly oriented parts removed from the annular feeder ring onto selected locations on the fixture ring as the ring is selectively rotated by the circuit means to receive the correctly positioned parts from the robot. Finally, returning means are provided to return improperly oriented parts rejected by the robot means and remaining on the annular ring to the feeder bowl for recycling.

Therefore, applicants have developed a new vibratory feeder bowl which is able to utilize both fully oriented and partially oriented parts so as to increase the production and flexibility of an automated assembly system in which it is utilized. In other words, applicants have developed a novel and improved feeder bowl apparatus that provides for an entirely new method of feeding, and that is particularly well suited to be utilized in an automated assembly system.

It is therefore an object of the present invention to provide an improved vibratory feeder bowl that has an increased throughput of parts.

It is another object of the present invention to provide an improved vibratory feeder bowl that acts to preorient parts being processed for placement by a conventional robot pick-and-place apparatus.

It is another object of the present invention to provide an improved vibratory feeder bowl that preorients the parts being processed to allow for greater flexibility in part picking by a conventional robot apparatus.

It is still another object of the present invention to provide an improved vibratory feeder bowl that is relatively small in size when compared to other parts-feeding apparatus with similar output.

It is still another object of the present invention to provide an improved vibratory feeder bowl that possesses enhanced performance capabilities when used in an automated assembly system.

It is still another object of the present invention to provide an improved vibratory feeder bowl that provides increased speed in the parts-feeding operation by increasing the throughput of oriented parts from the feeder bowl.

It is still another object of the present invention to provide an improved vibratory feeder bowl that handles parts gently to decrease damage thereto and that is not susceptible to parts jamming.

It is still another object of the present invention to provide an improved vibratory feeder bowl that possesses built-in storage capacity so as to reduce the necessary size of the parts hopper.

Finally, it is an object of the present invention to provide an improved vibratory feeder bowl that is specifically designed for integration with vision-guided robotic parts placement apparatus.

Some of the objects of the invention having been stated, other objects will become evident as the description proceeds, when taken in connection with the drawings described hereinbelow.

BRIEF DESCRIPTION OF THE DRAWINGS

FIG. 9 is a top plan view of the automated assembly system shown in FIG. 8 that incorporates the vibratory feeder bowl shown in FIG. 7 of the drawings.

BEST MODE FOR CARRYING OUT THE INVENTION

Figure 1:
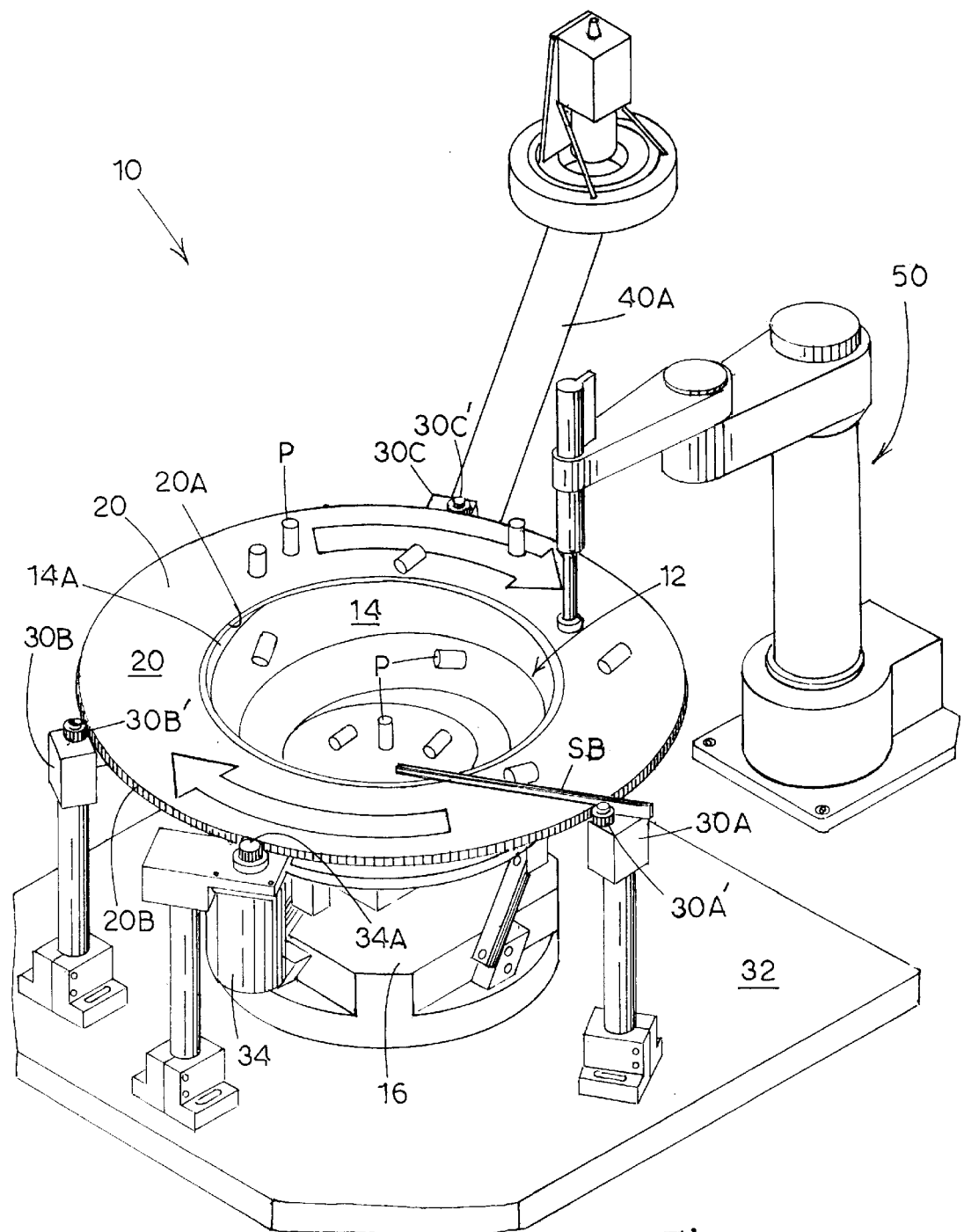
FIG. 1 is a perspective view of a vibratory feeder bowl embodying the present invention.

Referring now to FIGS. 1–6 of the drawings, a vibratory feeder bowl is shown therein and indicated generally by the reference 10. Apparatus 10 is particularly adapted for providing a high throughput of preoriented parts when used as an integral part of an automated assembly system, although applicants also contemplate other uses for apparatus 10. Apparatus 10 is adapted to feed either a plurality of one type of part or article P or a plurality of two or more parts or articles P in a simultaneous manner, in accordance with the choice of the user of apparatus 10.

Vibratory feeder bowl 10 comprises a feeder bowl generally indicated by reference numeral 12 which serves to contain a supply of parts or articles P which are caused to move upwardly along helical track 14 which spirals upwardly from the bottom of feeder bowl 12 and along the inner peripheral surface of the bowl. Track 14 terminates in an arcuate terminal uppermost portion 14A at the upper edge of feeder bowl 12 as best seen in FIGS. 1, 3, 4 and 6. Feeder bowl 12 is suitably vibrated by conventional vibration mechanism 16 that is operatively connected to the bottom of feeder bowl 12. Vibration mechanism 16 is of a conventional type (not shown in detail in the drawings). Vibration mechanism 16 serves to vibrate feeder bowl 12 so as to move articles or parts P onto and upwardly along the surface of track 14 until the parts successively arrive at the top of the top terminal portion 14A of track 14. Applicants contemplate that vibration mechanism 16 can be of any suitable type but most typically is configured to impart helical oscillatory motion to feeder bowl 12 so that feeder bowl 12 more or less oscillates around its vertical axis and simultaneously is vertically reciprocated by vibration mechanism 16. However, applicants contemplate that vibration mechanism 16 can be of any type that serves to vibrate articles or parts P onto and upwardly around the pathway of track 14 to the top of feeder bowl 12.

A rotatably movable annular feeder ring 20 surrounds the upper portion of feeder bowl 12 and comprises a substantially flat parts-carrying upper surface that is substantially planar with and adjacent to the terminal portion 14A of track 14. Annular feeder ring 20 is supported adjacent to its inside circumference 20A by the top of feeder bowl 14 and the outside circumference is supported by bearing blocks 30A, 30B and 30C which are each provided with horizontal and vertical bearings 30A, 30B and 30C, respectively, to engage the outside perimeter and bottom surface, respectively, of annular feeder ring 20. Bearing blocks 30A, 30B, and 30C are vertically and adjustably mounted to base 32 that also serves to support vibration mechanism 16. The inside circumference 20A of annular feeder ring 20 is suitably journalled to the uppermost edge of feeder bowl 12 so as to provide for both support and rotational movement of annular feeder ring 20 around stationary feeder bowl 12. Feeder ring 20 is about 12 to 36 inches in outside diameter and is driven at a variable rotational speed.

In order to selectively rotate annular feeder ring 20 around the circumference of stationary feeder bowl 12 in order that articles or parts P may be suitably removed from the uppermost terminal portion 14A of track 14, an electric motor 34 is mounted adjacent to the annular feeder ring 20 with gear sprocket 34A in driving engagement with gear teeth provided around the outermost perimeter 20B of annular feeder ring 20. Electric motor 34 is vertically mounted on an adjustable stand to base 32. Thus, when electric motor 34 is caused to be actuated, sprocket gear 34A will serve to rotatably drive annular feeder ring 20 until electric motor 34 is deactuated. A sweeper bar SB is mounted to bearing block 30A so as to traverse across annular feeder ring 20 in a downstream direction and to extend into feeder bowl 12 in order that incorrectly oriented parts that have been delivered from feeder bowl 12 and onto annular feeder ring 20 will be caused to be returned to the feeder bowl for reprocessing.

Figure 2:
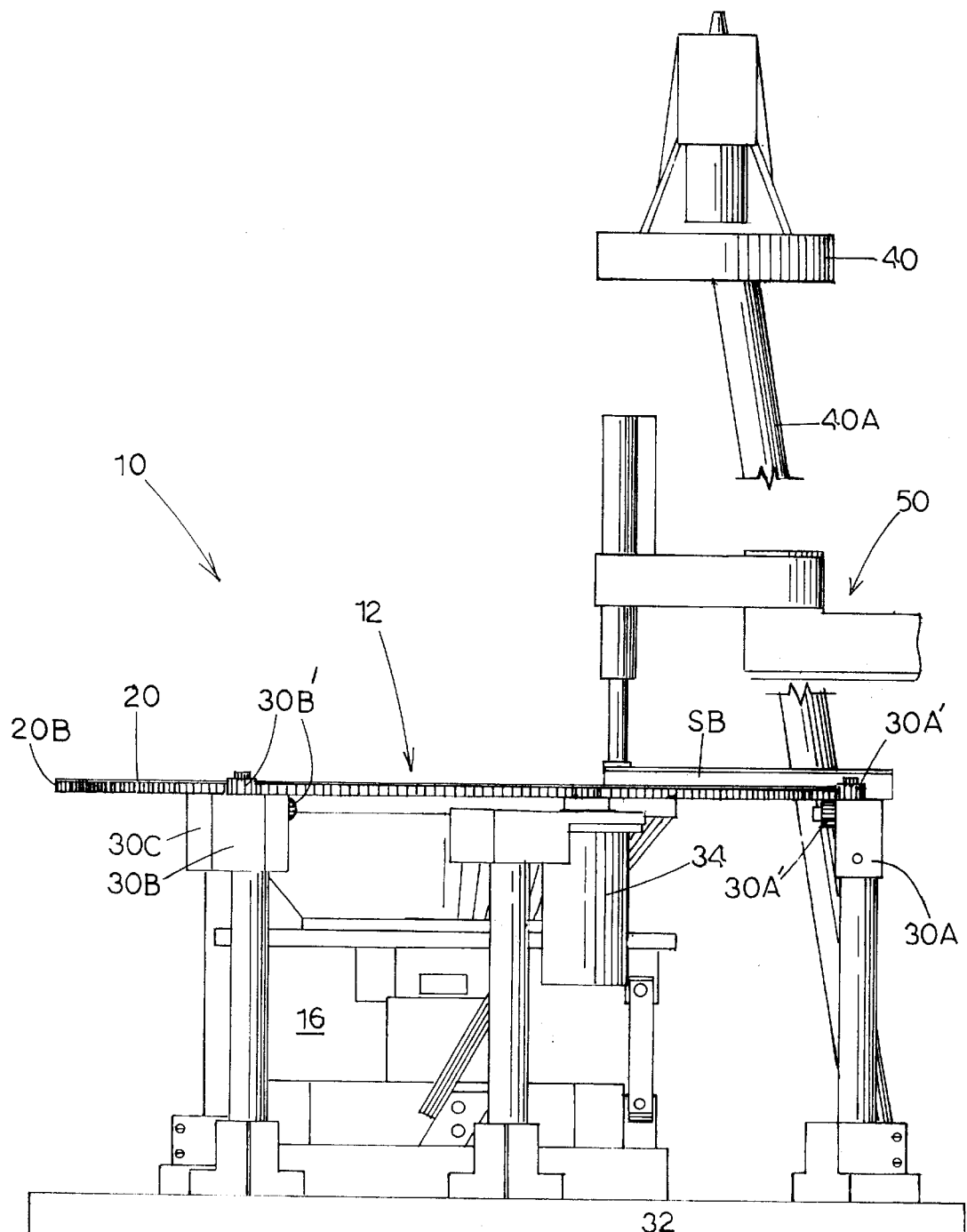
FIG. 2 is a side elevation view of the vibratory feeder bowl shown in FIG. 1.
Figure 3:
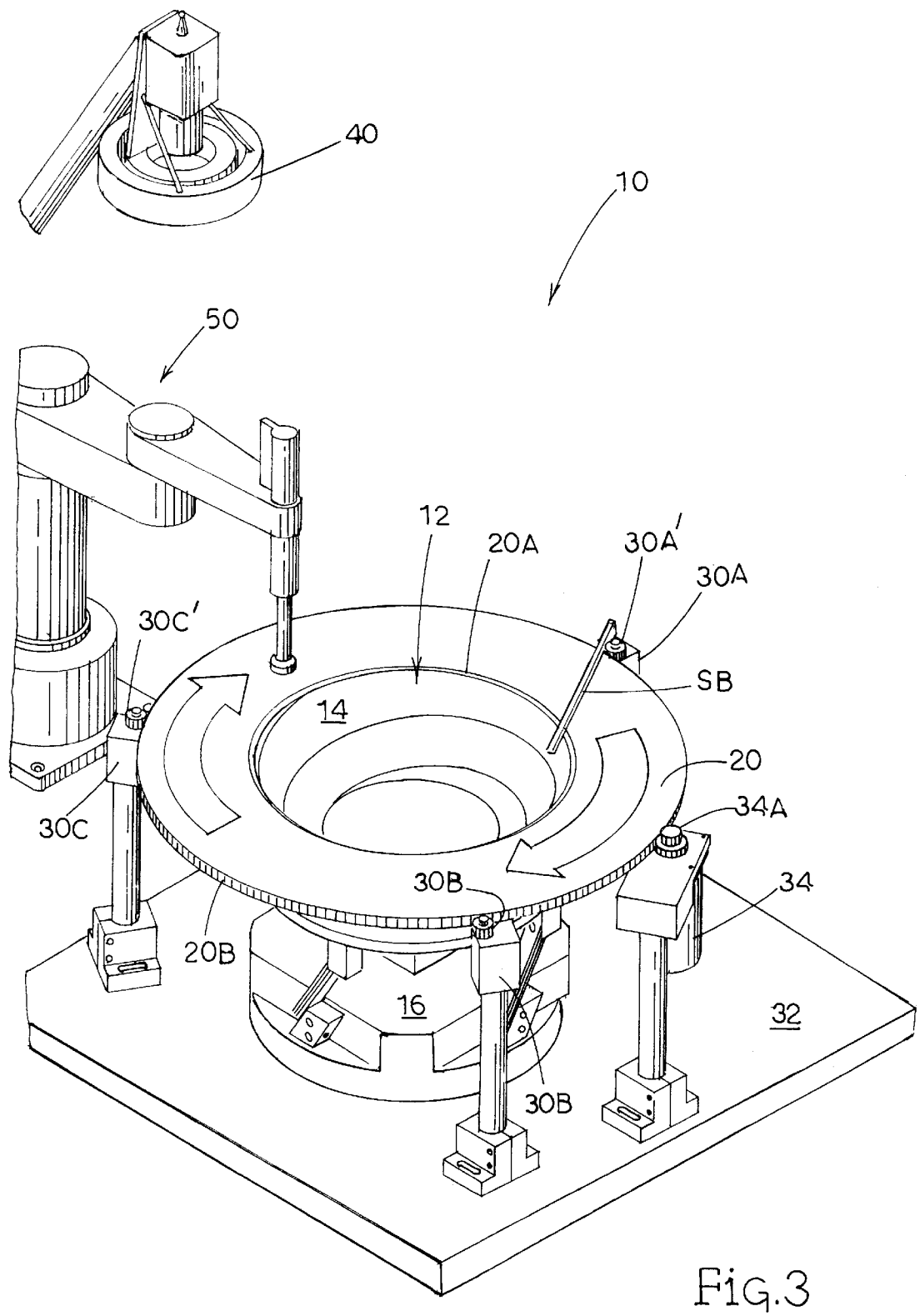
FIG. 3 is a perspective view of the vibratory feeder bowl shown in FIG. 1 in combination with an operatively associated camera and vision-guided parts placement robot.
Figure 4:
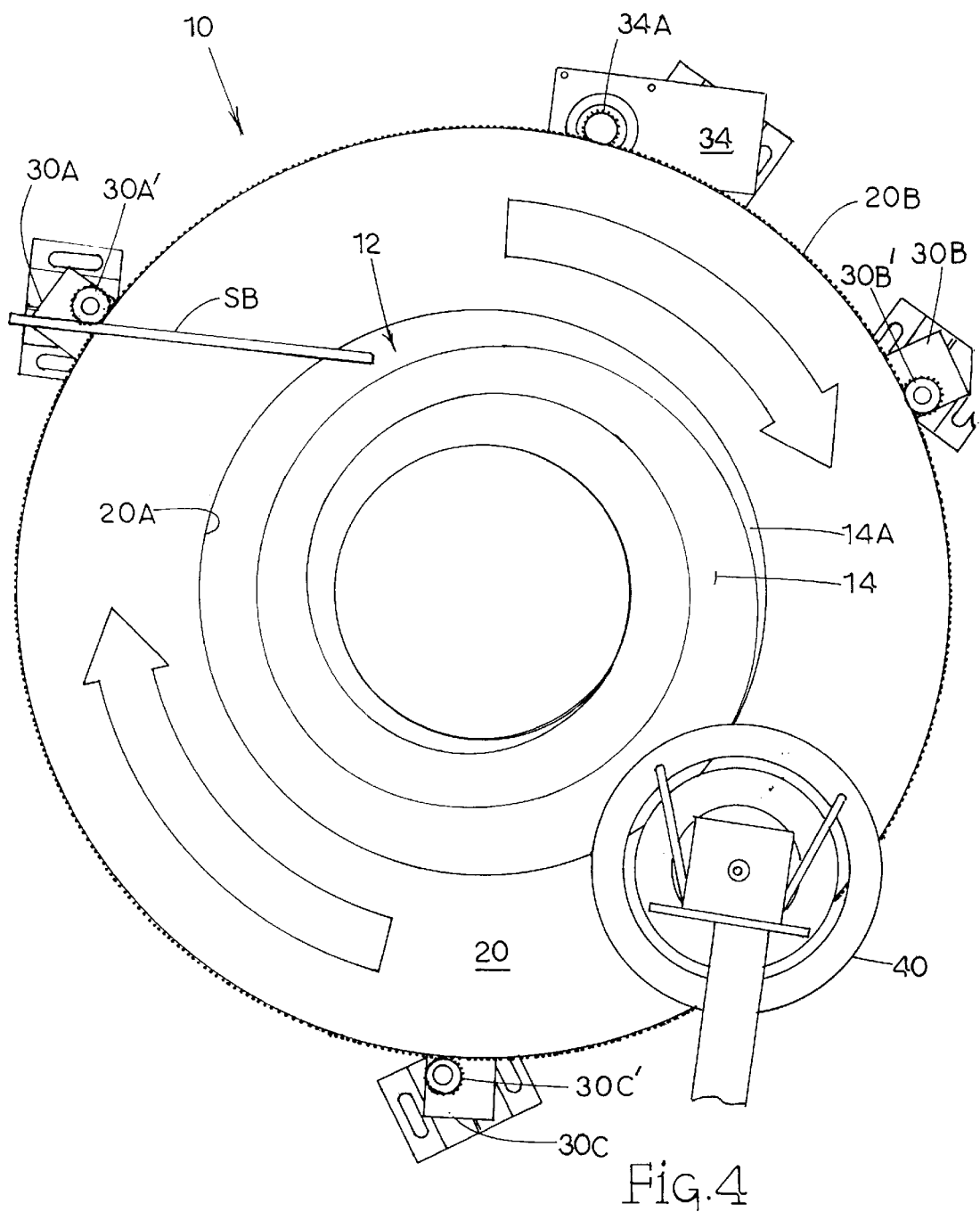
FIG. 4 is a top plan view of the vibratory feeder bowl shown in FIG. 1 with the camera shown positioned over a predetermined portion of the rotatably movable annular feeder ring.

As best seen in FIGS. 2, 3 and 4, a vision system comprising a stationary mounted camera 40 is held in vertical relationship above a selected portion of annular feeder ring 20 by vertical support 40A. Although camera 40 could be positioned in a variety of selected locations above feeder ring 20, a preferred location is downstream of the point where the terminal uppermost end 14A of track 14 introduces parts or articles P onto annular feeder ring 20, upstream of sweeper bar SB and slightly upstream or overlapping the movement arc area of the robot to be described hereinbelow. Camera 40 serves to detect whether articles or parts P passing into its vision zone on annular feeder ring 20 are correctly oriented for removal from feeder ring 20 and placement onto a new site removed therefrom. To facilitate the distinguishment by camera 40 of correctly oriented parts P from incorrectly oriented parts P, annular feeder ring 20 is most preferably formed from a translucent material such as polycarbonate and provided with backlighting (not shown) therethrough. In this fashion, the vision system of vibratory feeder bowl 10 can locate correctly oriented parts for removal or retrieval from annular feeder ring 20 and relocation to another site in an automated assembly system in which feeder bowl apparatus 10 may be utilized.

Figure 5:
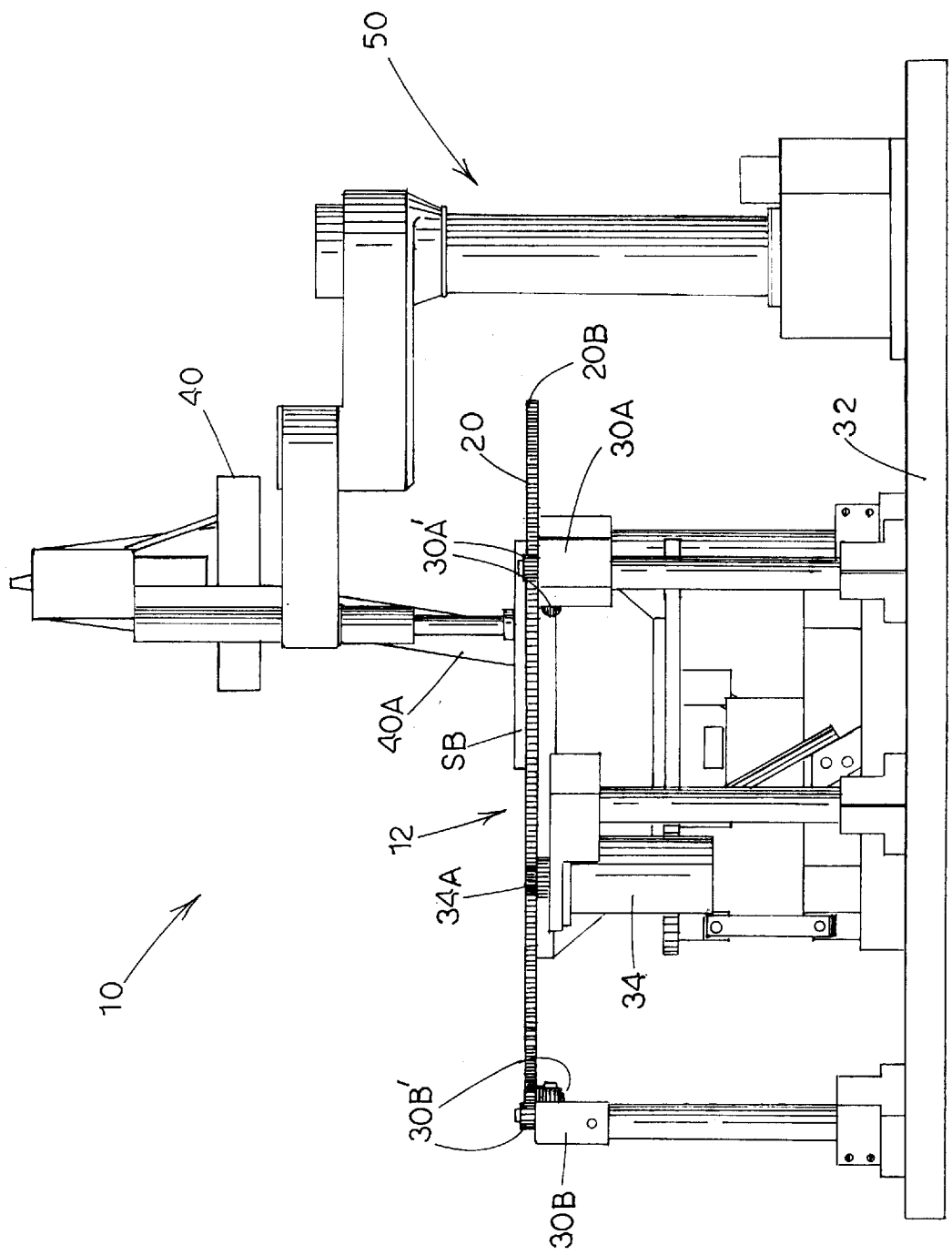
FIG. 5 is a side elevation view of the vibratory feeder bowl shown in FIG. 1 and an operatively associated camera and parts placement robot.
Figure 6:
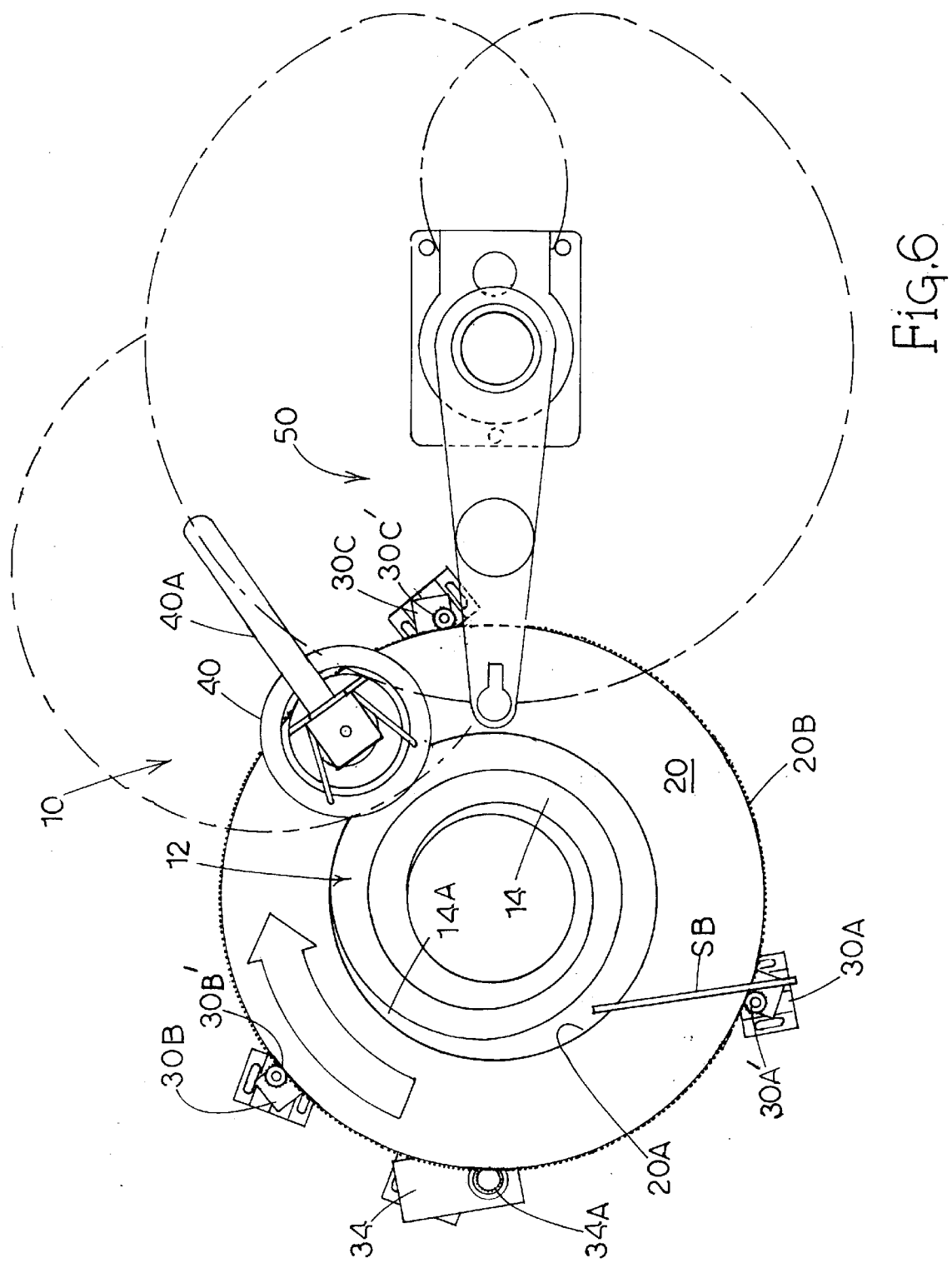
FIG. 6 is a top plan view of the vibratory feeder bowl shown in FIG. 1 and an operatively associated parts placement robot with the movement pathway of the robot that traverses a portion of the top surface of the annular feeder ring shown in broken lines.

In order to remove or retrieve parts P from annular feeder ring 20, a conventional pick-and-place robot 50 may be utilized, as best seen in FIGS. 5 and 6 of the drawings. Pick-and-place robot 50 is adapted to move through an arc that traverses a portion of annular feeder ring 20 from which correctly oriented parts P will be retrieved by pick-and-place robot 50. When all correctly oriented parts P in the vision zone of camera 40 are retrieved, feeder ring 20 will be activated again to feed more parts P to the vision zone for analysis by camera 40 and retrieval by robot 50 in response to the distinguishment of correctly oriented parts by the camera.

Finally, a control circuit (not shown) is provided that electrically interconnects vibration mechanism 16 of feeder bowl 12, electric motor 34 that rotatably actuates annular feeder ring 20, camera 40 and pick-and-place robot 50 for selectively detecting and retrieving correctly oriented parts from annular feeder ring 20 and allowing incorrectly oriented parts P to continue their movement on feeder ring 20 until contacted by sweeper bar SB and guided back into feeder bowl 12.

The control circuit is a matter of design choice for one skilled in the art. Generally, the circuit acts to actuate vibration mechanism 16 and annular feeder ring 20 as needed for a period of time in order to bring a vision zone of feeder ring 20 beneath camera 40. Vibration mechanism 16 and electric motor 34 rotatably driving feeder ring 20 are then deactuated and pick-and-place robot 50 actuated in order to retrieve correctly positioned parts P from the vision zone of annular feeder ring 20 and place the parts onto a new site. Once correctly oriented parts P in the vision zone of camera 40 have been depleted, vibration mechanism 16 and electric motor 34 are again actuated so as to continue feeding of parts P from feeder bowl 12 to rotating annular ring 20 and thereby to feed more parts P into the vision zone beneath camera 40 for distinguishment of correctly oriented parts from incorrectly oriented parts. Vibration mechanism 16 and electric motor 34 are then again deactuated so that the distinguished correctly oriented parts P can be removed by robot 50. In this fashion, vibratory feeder bowl 10 is able to process both partly oriented pieces and correctly oriented parts continuously in order to provide enhanced productivity of vibratory feeder bowl 10 that is particularly advantageous when bowl 10 is used as a component of an automated assembly system.

For a better understanding of the feeder bowl of the invention, the sequence of operation can be summarily described as follows:

Sequence of Operation

1. The vibratory bowl containing bulk parts of the same type or different types are delivered to the rotating ring (hereafter referred to as the feeder ring) that rotates around the topmost circumference of the vibratory feeder bowl.

2. The vibratory feeder bowl delivers parts that are correctly oriented, partially oriented, or incorrectly oriented onto the feeder ring. Some initial orientation takes place in the vibratory bowl before the parts move onto the feeder ring.

3. The feeder ring, driven by the programmable motor, moves the parts into the field of view of the camera mounted above the feeder ring. Then the feeder ring stops and jogs backward and forward in an attempt to separate parts that may be stacked on top of each other. The feeder ring has a slightly adherent surface so that parts that are in intimate contact with the feeder ring tend to stay in place while stacked parts are dislodged.

4. The feeder ring is made of a translucent material. The light source positioned beneath the feeder ring and in the camera's field of view back lights the parts on the feeder ring. The lighting serves to assist the camera in identifying the contours of correctly oriented parts on the feeder ring.

5. The camera identifies the contour and coordinates of a correctly-oriented part on the feeder ring and communicates this visual information to the pick-and-place robot. The robot circuitry uses the visual information from the camera to position the robot's pick-and-place mechanism to remove the parts from the camera's field of view. The robot then places the parts to a predetermined location.

6. When all correctly-oriented parts are removed, the feeder ring advances the next group of parts into the camera's field of view to repeat the cycle.

7. The remaining parts on the feeder ring are swept back into the vibratory feeder bowl by the sweeper bar mounted downstream of the camera and robot stations. The sweeper bar is adjustable to accommodate a variety of parts.

SECOND EMBODIMENT OF THE INVENTION

Figure 7:
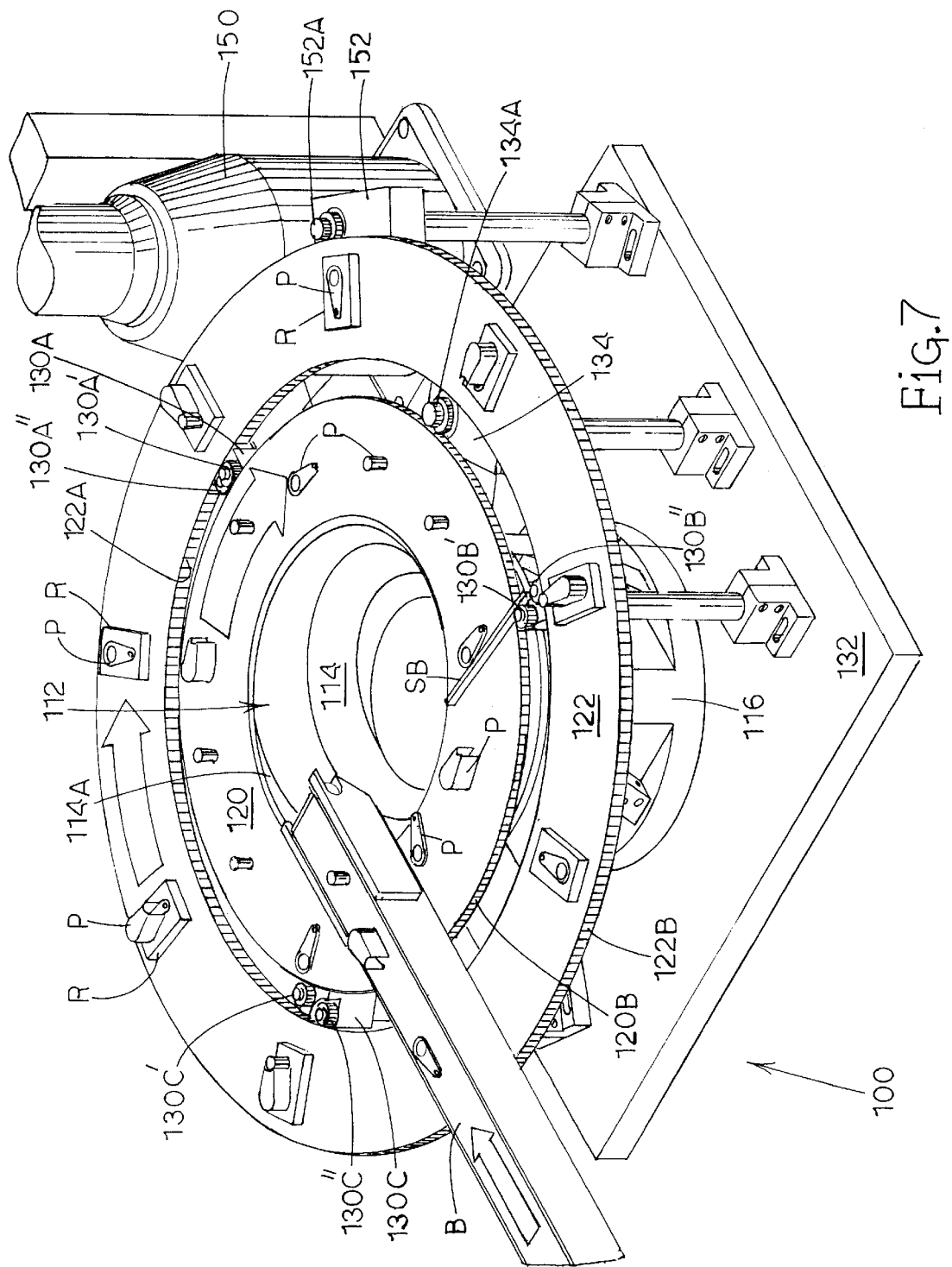
FIG. 7 is a perspective view of a second embodiment of a vibratory feeder bowl embodying the present invention.
Figure 8:
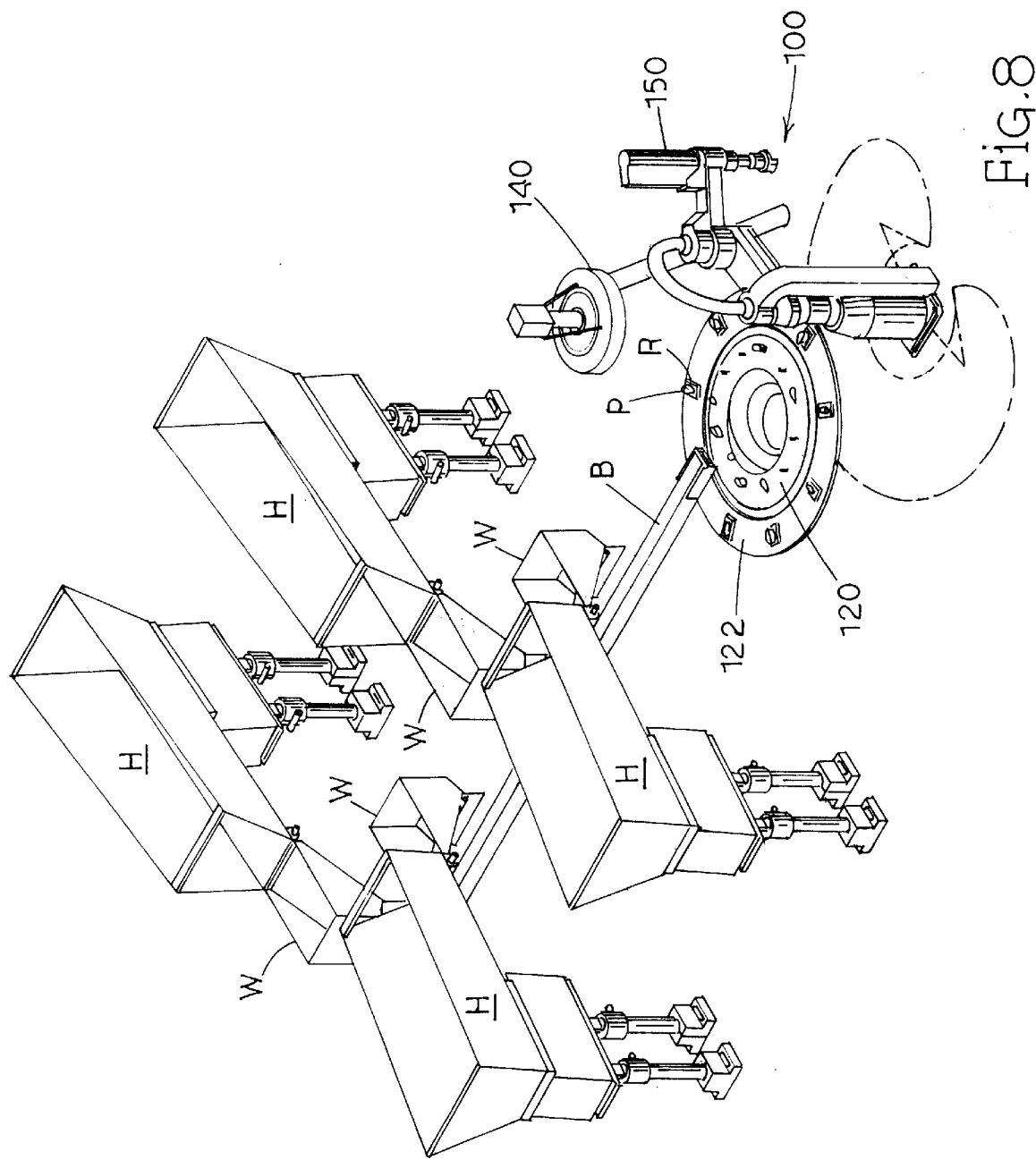
FIG. 8 is a perspective view of a representative automated assembly system incorporating the vibratory feeder bowl shown in FIG. 7.

Referring now to FIGS. 7–9 of the drawings, applicants contemplate alternative embodiment 100 of the vibratory feeder bowl of the invention is shown and will now be described herein. Second embodiment 100 of the vibratory feeder bowl comprises feeder bowl 112 that incorporates helical track 114 extending upwardly from the bottom of feeder bowl 112. Feeder bowl 112 is suitably vibrated by vibration mechanism 116 in order to cause article or parts P to move upwardly along the pathway of helical track 114 and successively arrive at the terminal uppermost portion 114A of the track that is adjacent to rotatable annular feeder ring 120. The alternative embodiment of the invention is best shown in FIGS. 7–9 of the drawings.

As best seen in FIG. 7, articles or parts P can be a plurality of different types of parts as well as a plurality of identical parts. For example, as can be seen in FIG. 7, parts P consist of three (3) separate types of parts P that will be retrieved from annular feeder ring 120 by pick-and-place robot 150 and sorted in accordance with the capabilities of the alternative embodiment 100 of the invention described herein.

Still referencing FIGS. 7–9 of the drawings, applicants note that vibratory feeder bowl 100 as described hereinbefore is substantially the same as first embodiment 10 of the invention. In order to further control the shortcomings of prior art feeder bowls in respect to parts jamming and resulting production interruptions in an automated assembly system, the second embodiment of the invention 100 still further enhances the performance of first embodiment 10 of vibratory feeder bowl by providing a second rotatable ring positioned concentric to and outwardly spaced-apart from annular feeder ring 120. The second selectively rotatable ring or disk (or more descriptively, annular fixture ring) is generally designated 122 in the drawings.

Selectively rotatable annular fixture ring 122 is selectively movable independently of annular feeder ring 120 by electric motor 152 and sprocket gear 152A that engages gear teeth provided around the outer circumference 122B of annular fixture ring 122 wherein the inner circumference of annular fixture ring 122 is designated 122A. As best seen in FIGS. 7–9 of the drawings, annular feeder ring 120 is defined by inside edge 120A that is suitably journalled to the top surface of feeder bowl 112 so as to be rotatably movable relative thereto and outermost edge 120B that defines gear teeth around the entire extent thereof. Similarly to the first embodiment of the invention hereinbefore, annular feeder ring 120 is selectively rotated by electric motor 134 that drives sprocket gear 134A which in turn drives annular feeder ring 120 due to its engagement with the gear teeth defining the outside circumference 120B of feeder ring 120. Also, similarly, electric motor 152 is vertically mounted to base 132 and rotates sprocket gear 152A that in turn rotatably drives fixture ring 122 by means of the gear teeth provided around the outer circumference 122B of ring 120. Feeder ring 120 has an outside diameter of 12 to 36 inches and is rotatably driven at a variable speed.

It should be appreciated that electric motor 134 for driving feeder ring 120 and electric motor 152 for driving fixture ring 122 are both independently controlled by a suitable control circuit (not shown) to effect the location and removal of correctly oriented parts P by robot 150 from feeder ring 120 and placement of the retrieved parts P upon a suitable predetermined receptacle R for that particular part P on fixture ring 122.

Annular fixture ring 122 is rotatably supported in its outwardly spaced-apart and concentric position with respect to annular feeder ring 120 by bearing blocks 130A, 130B, and 130C which are similar to bearing blocks 30A, 30B, and 30C in first embodiment 10 of the vibratory feeder bowl shown in FIGS. 1–6 of the drawings except each bearing block now carries an outermost pair of horizontal and vertical bearings 130A", 130B", and 130C", respectively, for supporting and facilitating rotatable movement of annular fixture ring 122. The innermost pair of bearings 130A', 130B', and 130C', respectively, are adapted to engage outermost edge 120B and the bottom outermost surface of annular feeder ring 120 whereas the outermost pair of bearings consist of a horizontal bearing for engaging the gear teeth defining inside perimeter 122A of fixture ring 122 and a vertical bearing for engaging the bottom surface adjacent innermost edge 122A of fixture ring 122. Annular fixture ring 122 is also additionally rotatably supported by outer bearings (not shown) similar to 30A, 30B and 30C in the first embodiment of the invention.

Finally, as best seen in FIGS. 8 and 9 of the drawings, vibratory feeder bowl 100 utilizes camera 140 to locate correctly oriented parts and pick-and-place robot 150 to retrieve visually determined correctly oriented parts P from the vision zone of camera 140 and place them individually onto their respective and corresponding receptacles R carried by the top surface of fixture ring 122. Once one or more predetermined number of parts P have been placed into each of receptacles R carried by fixture ring 122, the parts can be suitably retrieved for continued processing if feeder bowl 100 is being used in an automated assembly system.

The control circuit of vibratory feeder bowl 100 is contemplated to be similar to that of feeder bowl 10 but to provide for the additional selective movement of fixture ring 122 around feeder ring 120 as needed to fill each of receptacles R on the top surface thereof prior to feeder ring 120 being again rotated so as to bring a new supply of parts P into the vision zone of camera 140 and feeder ring 120 then stopped to facilitate retrieval of correctly oriented parts P by robot 150. Robot 150 then places each of the parts P according to a predetermined software program into corresponding receptacles R as the control circuit selectively and rotatively starts and stops fixture ring 122 in order to fill each of receptacles R.

As seen in FIGS. 8 and 9, feeder bowl apparatus 100 is particularly well-adapted for use in an automated assembly system such as the representative assembly system shown in the drawings wherein a plurality of parts hoppers H are placed in perpendicular orientation to conveyer belt B and wherein each of the plurality of hoppers H contains bulk parts P of one particular type. Hoppers H each have an operatively associated weighing device W where parts P are introduced before weighing devices W release parts P onto conveyer belt B. Conveyor belt B then transports the plurality of different type parts P into feeder bowl 112 of vibratory feeder bowl apparatus 100. Feeder bowl 112 feeds different parts P onto annular feeder ring 112 that is being rotated about feeder bowl 112. During the feeding process in feeder bowl 112, parts P will be partially preoriented or, in other words, a majority of the parts P will be correctly oriented while a smaller number will not be correctly oriented as all parts successively are caused to exit track 114 of feeder bowl 112 and are introduced onto annular feeder ring 120.

When parts P are within the vision field of camera 140, an image of each part P is taken and the control circuit processes the image and conveys corresponding information data to programmable pick-and-place robot 150. Robot 150 is guided by the vision system of camera 140 and the control circuit in order to pick each correctly oriented part P and place it into a predetermined corresponding fixed receptacle R on annular fixture ring 122 which is being rotated in a controlled fashion by electric motor 152 around annular feeder ring 120. Multiple receptacles R are positioned on fixture ring 122 and robot 150 is suitably programmed so as to determine the location of empty receptacles R and assemble parts P sequentially in successive receptacles R wherein one part P is placed in each receptacle R or wherein a plurality of different types of parts P are sequentially introduced into each of the plurality of receptacles R in sequential fashion. Improperly oriented parts P are removed from feeder ring 120 by sweeper bar SB similarly to feeder bowl 10.

In this manner, receptacles R are each filled with one or more parts P that will then be suitably removed from fixture ring 122 when all of receptacles R are properly filled with one or more parts P. It will be appreciated that if a plurality of parts P are introduced into each receptacle R, the parts may be of different types and will be introduced into each successive receptacle R in a predetermined sequence.

Thus, the alternative embodiment of vibratory feeder bowl 100 is highly advantageous over prior art parts feeding systems since elimination of in-line feeding devices and production and automated assembly production interruption due to jams are eliminated and a highly novel parts feeding apparatus is provided that is particularly advantageous for use as an integral part of an assembly automation system.

For a still better appreciation of the second embodiment of the invention, the sequence of operation can be summarily described as follows:

Sequence of Operation

1. Parts of the same type or different types are delivered from the vibratory feeder bowl to the feeder ring that rotates around the topmost circumference of the feeder bowl.
2. In the second embodiment, an additional rotating ring (hereafter referred to as the fixture ring) is placed around the periphery of the feeder ring. The fixture ring inside circumference is equally spaced in reference to the outside circumference of the feeder ring. The fixture ring is driven by the programmable motor.
3. Fixtures mounted to the fixture ring top surface serve as receptacles for placement of parts by the pick-and-place robot.
4. Electronic circuitry individually controls the vibratory feeder bowl, feeder ring, fixture ring, camera, and pick-and-place robot.
5. When the camera identifies a correctly oriented part on the feeder ring, the pick-and-place robot picks up the part and places it on one of the fixtures on the fixture ring. The control circuitry keeps track of the progress of each assembly on the fixture ring and determines to which fixture the robot will place a part.
6. If the fixture is not in the range of motion of the robot, the fixture ring moves into the robot's range and stops for the part to be placed.
7. The remaining parts on the feeder ring are swept back into the vibratory feeder bowl by the sweeper bar mounted downstream of the camera and robot stations. The sweeper bar is adjustable to accommodate a variety of parts.
8. A removal apparatus removes completed assemblies and transports them to a predetermined location.

It will be understood that various details of the invention may be changed without departing from the scope of the invention. Furthermore, the foregoing description is for the purpose of illustration only, and not for the purpose of limitation—the invention being defined by the claims.

What is claimed is:

1. In a vibratory part-feeding device of the type comprising a feeder bowl in which a generally helical track is formed that extends around the inner periphery of the bowl and which has a terminal portion at the upper edge of the bowl, feeder bowl vibrator means for vibrating the bowl to move parts onto the track and upwardly along the track to the terminal portion thereof wherein at least a portion of the parts are oriented in a correct predetermined position, the improvement comprising:

(a) a rotatably movable annular feeder ring surrounding the upper edge portion of the feeder bowl and having a substantially flat part-supporting surface that is generally in line with the terminal portion of the helical track;

(b) means supporting the annular feeder ring for rotation about the feeder bowl;

(c) annular feeder ring drive means for intermittently rotating the annular ring about the feeder bowl by being selectively started and stopped;

(d) robot means for removing selected parts from the annular feeder ring and depositing them at a predetermined new location;

(e) circuit means comprising a camera positioned above a portion of the annular feeder ring and acting to detect parts on the ring and signal the drive means to stop rotation of the annular ring and then signal the robot to effect removal of correctly positioned parts from the annular feeder ring and to deposit them at a predetermined new location while the annular ring is stationary, and to then signal the drive means to continue rotation of the annular ring so as to rotate a new parts-carrying portion of the annular ring into the camera's field of view; and (f) means for returning improperly positioned parts rejected by the robot means and remaining on the annular ring to the feeder bowl for recycling.

2. In a vibratory part-feeding device according to claim 1 wherein the annular feeder ring is between about 12 to 36 inches in diameter and is driven by the drive means at a variable speed.

3. In a vibratory part-feeding device according to claim 1 wherein the annular feeder ring defines a plurality of teeth around the perimeter thereof that are adapted to be drivingly engaged by a sprocket connected to the annular ring drive means.

4. In a vibratory part-feeding device according to claim 1 wherein the means supporting the annular feeder ring for rotation comprises a plurality of stationary bearings that are spaced-apart around the perimeter of the annular ring for supportingly engaging the same during rotation.

5. In a vibratory part-feeding device according to claim 4 wherein 3 of the bearings are spaced around the perimeter of the annular feeder ring.

6. In a vibratory part-feeding device according to claim 1 wherein the annular feeder ring drive means comprises a servo motor.

7. In a vibratory part-feeding device according to claim 1 wherein the robot means comprises a pick-and-place robot.

8. In a vibratory part-feeding device according to claim 1 wherein the circuit means comprises a camera fixedly positioned over a selected viewing area of the annular feeder ring, and the annular ring is formed from translucent material and provided with backlighting therebeneath to facilitate the camera detecting correctly oriented parts.

9. In a vibratory part-feeding device according to claim 8 wherein the annular feeder ring is formed from a translucent material comprising polycarbonate.

10. In a vibratory part-feeding device according to claim 1 wherein the means for returning improperly positioned parts remaining on the annular feeder ring comprises an elongate guide transversing the annular ring and extending generally toward the feeder bowl, said elongate guide being positioned downstream of the location where the robot means removes selected parts from the rotating annular ring.

11. In a vibratory part-feeding device according to claim 1 including a rotatably movable annular fixture ring surrounding the annular feeder ring and concentric therewith, the annular fixture ring being selectively rotated around the annular feeder ring by annular fixture ring drive means in operative connection with the circuit means, the circuit means further serving to signal the robot to deposit correctly positioned parts removed from the annular feeder ring onto selected locations on the fixture ring as the fixture ring is selectively rotated by the circuit means to receive the correctly positioned parts from the robot.

12. In a vibratory part-feeding device according to claim 11 wherein said annular fixture ring includes a plurality of receptacles for parts deposited thereon.

13. In a vibratory part-feeding device according to claim 12 wherein the receptacles each define a plurality of compartments for receiving different parts, and the signals from the circuit means to the robot cause the robot to deposit the different parts into their respective corresponding compartments in the receptacles of the annular fixture ring.

14. In a vibratory part-feeding device according to claim 11 wherein a plurality of different parts are fed to the feeder bowl by a corresponding plurality of hoppers and operatively associated weighing devices that deposit the parts onto a conveyor belt that in turn transports the parts to the feeder bowl.

15. In a vibratory part-feeding device of the type comprising a feeder bowl in which a generally helical track is formed that extends around the inner periphery of the bowl and which has a terminal portion at the upper edge of the bowl, feeder bowl vibrator means for vibrating the bowl to move parts onto the track and upwardly along the track to the terminal portion thereof wherein at least a portion of the parts are oriented in a correct predetermined position, the improvement comprising:

(a) a rotatably movable annular feeder ring surrounding the upper edge portion of the feeder bowl and having a substantially flat part-supporting surface that is generally in line with the terminal portion of the helical track;

(b) means supporting the annular feeder ring for rotation about the feeder bowl;

(c) annular feeder ring drive means for intermittently rotating the annular ring about the feeder bowl by being selectively started and stopped;

(d) robot means for removing selected parts from the annular feeder ring and depositing them at a predetermined new location;

(e) circuit means comprising a camera positioned above a portion of the annular feeder ring to detect parts on the ring and signal the drive means to stop rotation of the annular ring and then signal the robot to effect removal of correctly positioned parts from the annular feeder ring and to deposit them at a predetermined new location while the annular ring is stationary, and to then signal the drive means to continue rotation of the annular ring so as to rotate a new parts-carrying portion of the annular ring into the camera's field of view;

(f) a rotatably movable annular fixture ring surrounding the annular feeder ring and concentric therewith, said annular fixture ring being selectively rotated around the annular feeder ring by annular fixture ring drive means in operative connection with the circuit means, the circuit means further serving to signal the robot to deposit correctly positioned parts removed from the annular feeder ring onto selected locations on the fixture ring as the fixture ring is selectively rotated by the circuit means to receive the correctly positioned parts from the robot; and (g) means for returning improperly positioned parts rejected by the robot means and remaining on the annular ring to the feeder bowl for recycling.

16. In a vibratory part-feeding device according to claim 15 wherein the annular feeder ring is between about 12 to 36 inches in diameter and is driven by the feeder ring drive means at a variable speed.

17. In a vibratory part-feeding device according to claim 15 wherein the annular feeder ring defines a plurality of teeth around the perimeter thereof that are adapted to be drivingly engaged by a sprocket connected to the annular ring drive means.

18. In a vibratory part-feeding device according to claim 15 wherein the means supporting the annular feeder ring for rotation comprises a plurality of stationary bearings that are spaced-apart around the perimeter of the annular ring for supportingly engaging the same during rotation.

19. In a vibratory part-feeding device according to claim 18 wherein 3 of the bearings are spaced around the perimeter of the annular feeder ring.

20. In a vibratory part-feeding device according to claim 15 wherein the annular feeder ring drive means comprises a servo motor.

21. In a vibratory part-feeding device according to claim 15 wherein the robot means comprises a pick-and-place robot.

22. In a vibratory part-feeding device according to claim 15 wherein the circuit means comprises a camera fixedly positioned over a selected viewing area of the annular feeder ring, and the annular feeder ring is formed from translucent material and provided with backlighting therebeneath to facilitate the camera detecting correctly oriented parts.

23. In a vibratory part-feeding device according to claim 22 wherein the annular feeder ring is formed from a translucent material comprising polycarbonate.

24. In a vibratory part-feeding device according to claim 15 wherein the annular fixture ring is between about 24 to 48 inches in diameter and is driven by the drive means at a variable speed.

25. In a vibratory part-feeding device according to claim 15 wherein the annular fixture ring drive means comprises a servo motor.

26. In a vibratory part-feeding device according to claim 15 wherein the annular fixture ring is rotatably mounted on a plurality of spaced-apart bearings for rotation around the annular feeder ring.

27. In a vibratory part-feeding device according to claim 15 wherein said annular fixture ring includes a plurality of receptacles for parts deposited thereon.

28. In a vibratory part-feeding device according to claim 27 wherein the receptacles each define a plurality of compartments for receiving different parts, and the signals from the circuit means to the robot cause the robot to deposit the different parts into their respective corresponding compartments in the receptacles of the annular fixture ring.

29. In a vibratory part-feeding device according to claim 15 wherein a plurality of different parts are fed to the feeder bowl by a corresponding plurality of hoppers and operatively associated weighing devices that deposit the parts onto a conveyor belt that in turn transports the parts to the feeder bowl.

30. In a vibratory part-feeding device according to claim 15 wherein the means for returning improperly positioned parts remaining on the annular feeder ring comprises an elongate guide transversing the annular ring and extending generally toward the feeder bowl, said elongate guide being positioned downstream of the location where the robot means removes selected parts from the rotating annular ring.

* * * * *